United States Patent [19]

Hart

[11] Patent Number: 4,529,664
[45] Date of Patent: Jul. 16, 1985

[54] METHOD OF PRODUCING IMPROVED METAL-FILLED ORGANIC COATINGS AND PRODUCT THEREOF

[75] Inventor: Robert G. Hart, Bethlehem, Pa.

[73] Assignee: Bethlehem Steel Corporation, Bethlehem, Pa.

[21] Appl. No.: 636,051

[22] Filed: Jul. 30, 1984

Related U.S. Application Data

[63] Continuation-in-part of Ser. No. 534,012, Sep. 20, 1983, abandoned.

[51] Int. Cl.³ .......................... B32B 15/04; B05D 3/06
[52] U.S. Cl. .................................... 428/457; 204/164; 427/39; 427/40; 427/41; 428/461
[58] Field of Search ................... 428/457, 461; 427/41, 427/39, 35, 40; 204/164

[56] References Cited

U.S. PATENT DOCUMENTS

| | | | |
|---|---|---|---|
| 3,849,141 | 11/1974 | Palm et al. | 428/457 X |
| 4,126,712 | 11/1978 | Poliniak et al. | 427/41 |
| 4,459,319 | 2/1984 | Hosaka et al. | 427/40 |

FOREIGN PATENT DOCUMENTS 1440830  6/1976  United Kingdom ................. 427/82

*Primary Examiner*—Thomas J. Herbert
*Attorney, Agent, or Firm*—William B. Noll

[57] ABSTRACT

The present invention relates to the method of producing a metal-filled organic coating on a substrate, which coating provides enhanced corrosion protection to said substrate, and to the product of such method. More particularly, this invention is directed to the enhancement of the corrosion resistant properties of zinc-rich organic coatings by subjecting such coatings to an electric discharge such as in corona discharge treatment.

14 Claims, 3 Drawing Figures

METHOD OF PRODUCING IMPROVED METAL-FILLED ORGANIC COATINGS AND PRODUCT THEREOF

RELATED APPLICATION

This application is a continuation-in-part of Ser. No. 534,012, filed Sept. 20, 1983, now abandoned.

BACKGROUND OF THE INVENTION

The present invention is directed to a method of improving the corrosion-resistant properties of metal-filled organic coatings on a metal substrate and to the product thereof. More particularly, this invention is directed to enhancing the galvanic properties of zinc-rich organic coatings on steel substrates. Improving the corrosion resistant properties of a product as a means to extend the life thereof has been a concern of mankind for many, many years. The concept of providing a metal or protective layer over a substrate, to electro-chemically protect the substrate is the oasis of one of the oldest processes for protection against corrosion. Electrogalvanizing and hot-dip galvanizing, i.e. coating steel with zinc, are two methods which have been practiced for years to protect steel.

A more recent development is the use of metal-filled organic resin systems. One such system is taught in U.S. Pat. No. 3,849,141 to Palm, et al., and to other systems referred to therein. Briefly, a pre-paint coating composition is applied to a cleaned steel base followed by a top coating of a zinc-filled organic resin.

The role of the metal-filled layer, is to allow electric resistance spot-welding, and to provide protection to the underlying steel as a barrier between the elements of the atmosphere and the steel, and through cathodic protection. Zinc, insofar as it relates to steel, is an ideal filler metal to satisfy this role described above. Accordingly, the further description herein shall be directed to the use of zinc and its function with regard to this invention.

Protection through the imposition of a barrier layer is simply to isolate the underlying steel substrate from the corrosive actions of the environment. There are many materials which can at least provide some initial protection to steel by such mode of protection. However barrier layer protection has its limits due to weathering, erosion or especially damage to the barrier layer as a result of forming operation, welding, impact or scraping. Accordingly, another important mode of protection for steel is what has become known as sacrificial or galvanic protection.

Galvanic protection of steel is an electrochemical process involving the steel substrate, the zinc layer, and the atmosphere. Through contact of the three elements of the system, i.e. steel, zinc, and electrolyte, an electric potential is established. As a result of the more noble position of iron over zinc in the electrochemical series of metals, the zinc is sacrificed thereby retaining the integrity of the iron or steel. The formulas for the electrochemical action taking place are as follows:

o - Dissolution of zinc $$Zn \rightarrow Zn^{+2} + 2e^-$$

o - Reduction Reactions on Steel $$\tfrac{1}{2}O_2 + H_2O + 2e^{31} \rightarrow 2OH^-$$

in neutral or alkaline solutions, or $$2H^+ + 2e^- \rightarrow H_2$$

$$\tfrac{1}{2}O_2 + 2H^+ + 2e^- \rightarrow H_2O;$$

in acid solutions.

A key element in this entire reaction process is electrical contact between the zinc and the steel so that an electric current can flow. It will be seen from the specifications which follow that through the application of an electric discharge treatment, a zinc-rich organic coating can be transformed from a mere barrier coating to a combined galvanic/barrier coating which affords cathodic protection to bare steel exposed at cut edges and at locations of damage to the coating.

SUMMARY OF THE INVENTION

The present invention is directed to the method of producing a metal-filled organic coating on a substrate, which coating provides enhanced corrosion protection to said substrate, and to the product of such method. More particularly, this invention is directed to the enhancement of the corrosion resistant properties of zinc-rich organic coatings by subjecting such coatings to an electric discharge, e.g. corona discharge The voltage thereof must be sufficient to cause an electric discharge in the gases present in a gap between an electrode and the surface to be treated. Electrochemical tests, to be described in these specifications, indicate that galvanic currents from discharge-treated zinc-rich organic coatings are many times greater than untreated coatings and are in fact comparable to hot-dip or electroplated galvanized coatings. This latter feature is indicative of the ability of the discharge-treated coating to provide sacrificial galvanic protection to the underlying ferrous substrate at sites of damage to the coating.

DETAILED DESCRIPTION OF PREFERRED EMBODIMENT

Figure 1:
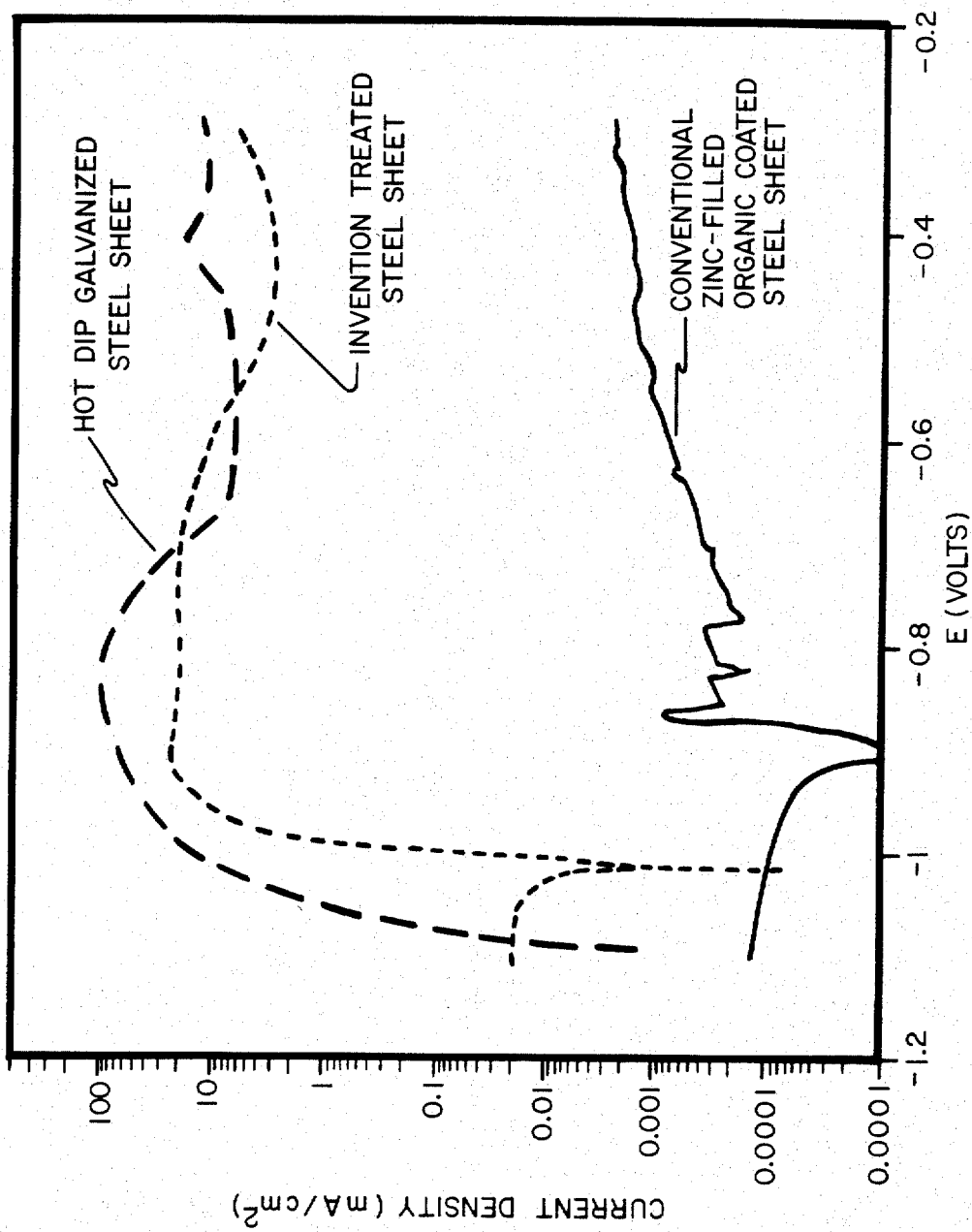
FIG. 1 is a graph illustrating the galvanic protection currents of the product of this invention, and of two prior art products.

This invention is directed to a method to improve the galvanic corrosion protection afforded to a ferrous substrate by a metal-filled organic coating, and to the product thereof. Metal-filled organic coatings, when applied to a ferrous sub-strate such as steel sheet, have been known for several years. However, as will be seen by the specifications which follow, such coatings have been characterized as offering little cathodic protection to the underlying ferrous substrate.

Organic coatings using zinc as the metal filler have been developed in recent years. A commercial product utilizing such a coating is ZINCROMETAL a registered trademark of Diamond Shamrock Corporation. ZINCROMETAL a zinc-rich paint system typically applied to only one side of a steel strip on a continuous coil coating paint line is actually a dual coat system wherein the initial coat is a proprietary mixture of chromic acid, zinc dust and other chemicals, while the outer coating is an organic resin containing zinc powder. For more information regarding such dual coat system, reference may be made to U.S. Pat. Nos. 3,687,738;

3,671,331 and 3,382,081 all of which are assigned to Diamond Shamrock Corporation or to an article entitled, "A Review of the Use of ZINCROMETAL in the Automotive Industry," by A. W. Kennedy, 1978, Society of Automotive Engineers, Inc.

ZINCROMETAL as a coated sheet product has been accepted by the automotive industry in significant and increasing quantities over the years for providing certain corrosion resistant properties to various auto body panels. However, despite the significant amount of zinc present in the coating, such coating offers little galvanic protection to the underlying steel body panel. Such a fact has been reported in the technical journals. For example, in Nippon Steel Technical Report No. 18, December 1981, entitled "Development of Metal-Finished Steel Sheets for Automotive Applications and Their Properties," the authors report "To obtain galvanic protection by using zinc-rich paint, the zinc powder must be more than 90% by weight of the paint a practice that impairs the paint adhesion . . . ". That is, galvanic protection and paint adhesion are factors working against each other. For a detailed discussion of pigment loading, i.e. loading the pigment with zinc powder, see "Geometrics of Organic Zinc Rich Primers and Their Effects on Pigment Loading," in Modern Paint and Coatings, June 1983. In any case, for additional discussion on the galvanic shortcomings of ZINCROMETAL, see ASM Metals/Materials Technology Series, an article entitled "Electro-Alloy-Coated Steel Sheets Developed by Nippon Steel for the Auto Body," presented at 1982 ASM Metals Congress, St. Louis, Mo., Oct. 23-28, 1982. Here, the author confirms that "ZINCROMETAL" is a typical corrosion preventive organic coated steel sheet for automotive use. However, ZINCROMETAL has some practical problems such as insufficient sacrificial corrosion preventive action . . . ".

From the above, and confirmed by experience gained through years of use in the automotive industry, prepainted sheets for automotive use must be characterized by good paint adhesion as evidenced by freedom from flaking during press working,
good weldability, and
good corrosion resistance.

As reported in the first article, weldability and galvanic protection can be enhanced by significantly raising the pigment volume concentration (pvc), i.e. raising the metal (zinc) content of the paint to over 90%, by weight. However, adhesion of the paint is poor at such metal loadings. And, even at high metal loadings galvanic protection is much less than that provided by metallic zinc coatings, e.g. hot-dip galvanized or electroplated zinc. Unexpectedly it was discovered that all such characteristics could not only be retained, but the missing galvanic protection bestowed, by the teachings of this invention to metal-filled organic coatings.

In the practice of this invention, a metal-filled organic coated product is subjected to a high voltage electric discharge, such as in corona-discharge treatment. While such treatments have been known as a means for improving the surface energy properties of organic resins heretofore they have not been applied to coatings as a way of significantly increasing galvanic activity, i.e. improving the galvanic properties of such coatings.

In any case, FIG. 1 illustrates the effect of such treatment, by electrochemical data, on the product of this invention. The product of this invention compares favorably with hot-dip galvanized steel, each of which provide several orders of magnitude more sacrificial current than the untreated zinc-containing organic coating of the prior art. Such figure clearly shows that subjecting zinc-rich organic coatings to an electric discharge greatly increases galvanic currents obtainable from the coating in electrochemical corrosion tests. At an impressed voltage of $-0.8$ volts vs. SCE, the galvanic protection current provided by the treated zinc-rich organic coating is at least 1 mA/cm$^2$, values which compare favorably to hot-dip galvanized steel is known for its galvanic protection for steel.

While the invention is directed to the use of any articulate filler metal or alloy thereof, where improved conductivity is desired, of special interest are those metals which are capable of galvanically protecting steel, i.e. Zn, Al, Mg, and alloys thereof. Among such metals, the preferred embodiment is a zinc-filled organic coating For purposes of illustration, a description of such preferred embodiment is offered.

A preferred product of this invention is one which includes the steps of applying a first corrosion inhibiting layer to a steel base prior to the application of the coating of this invention. An example of such a first coating is the coating described in U.S. Pat. No. 3,687,738, noted previously, directed to a coating of CrO$_3$ and pulverulent metal, such as zinc dust, in a liquid medium. After suitable drying and curing of the coating the thus coated steel base is ready for a second coating. An alternative first corrosion inhibiting layer may be an electroplated metal layer, such as zinc or a zinc alloy. Such a layer provides the desired corrosion protection and avoids the drying and curing steps, features of the above pulverulent metal containing liquid coatings. In any case, to such first corrosion inhibiting layer there is applied a second or top coating. Such top coating may be applied by any conventional method for applying a liquid coating to a substrate, for example, dip coating, roller coating, spray or brush coating, etc. By any of such methods, the coating thickness should be in the range of about 0.5 to 1.0 mil, preferably no more than about 0.75 mils. This dual coating must now be cured. A typical curing treatment is one which includes heating the metal-filled organic coated product to a peak metal temperature of 550° F., followed by water quenching and air drying of the product.

The above type of product, insofar as the automotive industry is concerned, is used to fabricated sheet metal body panels. In this operation and during handling, damage to the coating may occur by scratching, fracture or flaking. In addition, through use of the car by driving on the highway, etc, such coating system can become damaged thereby exposing are steel to the corrosive elements. Despite the presence of zinc, which is normally protective of steel, the lack of electrical contact among the zinc particles in the coating, and etween the zinc particles and the steel base allows the steel to quickly rust presenting an unsightly appearance and leading to perforation of the steel sheet.

By following the teachings of this invention, it is possible to transform the character of such coating system from primarily barrier protection to a combination galvanic/barrier protection. To illustrate this combination properly, a steel sheet was given a dual coating, such as described above, and a portion thereof subjected to the electric discharge treatment of this invention.

Example

1. A low-carbon steel sheet was selected and suitably cleaned by an alkaline cleanser to remove grease and oxides which may be present on the sheet surface.
2. To such cleaned steel sheet, an adhesion promoting, corrosion-resistant base coat was applied.
3. A slurry of an organic coating was prepared, containing zinc powder (85% by weight of the coating) and applied to the surface of such steel sheet to yield a dry coating thickness of about 0.8 mils.
4. The coated product of (3) was then heated to a steel sheet temperature of 550° F., water quenched and air dried.
5. A portion of such coated steel sheet was subjected to an electric discharge treatment, i.e. 9.6 KHZ corona discharge to approximately 10 watt-sec/in$^2$. of as-produced coated product
6. Sheet samples of as-produced coated product (product of #4) and corona discharge treated product (product of #5) were each coated with an automotive cathodic electrophoretic primer (ED 3002 V, mfg. by PPG Industries) to a thickness of 23 $\mu$m.
7. A scribe line was scratched in all sheet samples to expose bare steel and then placed in a salt spray cabinet operated according to ASTM Standard B117.

Upon inspection, red rust appeared on the scribe line of the as-produced coated product (product of #4) in less than 100 hours. However, the corona discharge treated product remained free of red-rust for the full 1200 hours of the test, clearly demonstrating the effectiveness of the coating's sacrificial powers to galvanically protect the steel.

As noted previously, a key element in the cathodic protection process is contact between the zinc, the steel, and the electrolyte. By this invention it was discovered that the corona-discharge treatment reduces the resistivity of the organic coating by several orders of magnitude. The converse of this is that the conductivity of the coating significantly increased It is hypothesized that the corona-discharge treatment has the effect of electrically interconnecting the metal, i.e. zinc, particles in the coating and connecting the particles to the metal substrate, possibly by causing dielectric breakdown of insulating air-formed oxide films and/or resin barriers that otherwise act as electrical insulators. It follows from this that the necessary electrical contact between the zinc and the metal substrate is made for effective cathodic protection.

Figure 2A:
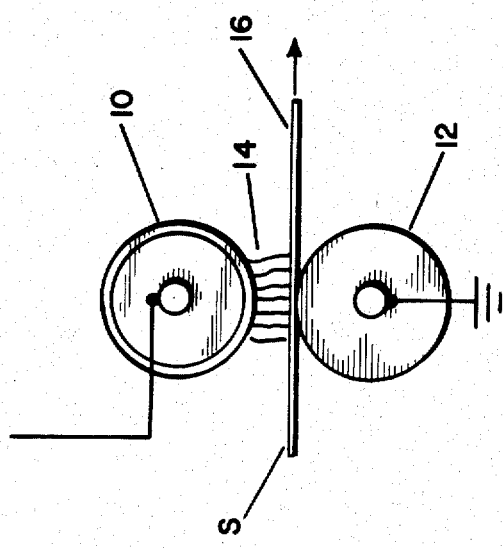
FIGS. 2 and 2a are schematic representations (front and side elevations, respectively) of a system for practicing this invention in a continuous manner.
Figure 2:
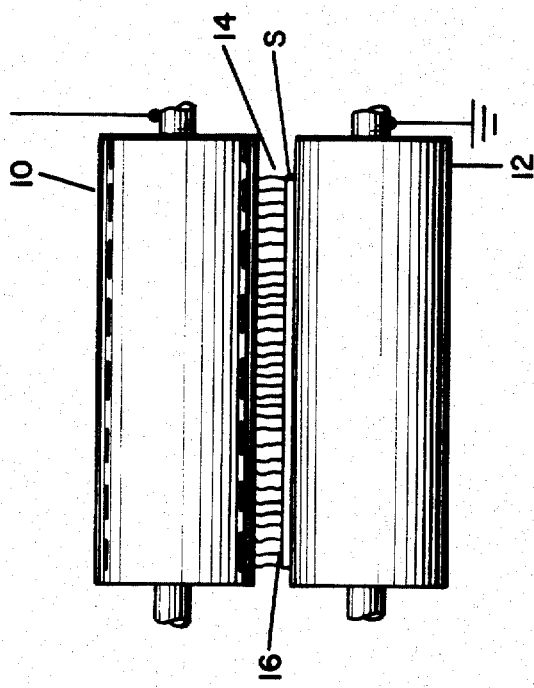

While the method of this invention can be practiced as a batch operation, commercial advantages may be realized in a continuous operation. For example, the discharge treatment may be practiced in conjunction with the coating operation. As stated previously, the coating is accomplished on a coil coating line. Coils of steel are fed into one end of the processing equipment, cleaned and coated (optionally) with a first corrosion inhibiting layer or electroplated metal base layer. After baking, where required by such first corrosion inhibiting layer, a second metal-filled organic coating or top coat is applied. Again there is curing of the coating such as by baking and quenching the coated strip. Before rewinding of such strip, it may be subjected to equipment illustrated schematically in FIGS. 2 and 2a. Such FIGURES show apparatus for continuously corona discharge treating one-side-coated sheet steel, the product so widely used in the automotive industry In the apparatus, the strip "S" (coated side up) passes between rolls 10, 12 to which a high voltage has been applied. Such voltage, the degree of which is readily determined by one skilled in the art, must be sufficient to cause an electric discharge in the gases present in the gap 14 between the roll 10 and the surface 16 of the strip "S". Thereafter, the strip "S" may be rewound or coiled as known in the art. By such treatment the coating has been transformed from a mere barrier coating to a combined galvanic/barrier coating which affords cathodic protection at exposed areas of the underlying sheet steel.

I claim:

1. A metal-filled organic coated metal product of improve conductivity, where such coating affords galvanic protection to the underlying metal substrate as measured by a potentiostatic anodic current of at least 1 mA/cm$^2$ at an impressed voltage of $-0.8$V vs. SCE.

2. The metal-filled organic coated product according to claim 1 wherein said metal product is a ferrous alloy.

3. The metal-filled organic coated ferrous product according to claim further in that said metal is selected from the group consisting of zinc, aluminum, magnesium, and alloys thereof.

4. The metal-filled organic coated ferrous product according to claim 3 wherein said product contains a first corrosion inhibiting layer intermediate said metal substrate and said organic coating.

5. The metal-filled organic coated ferrous product according to claim further in that said metal is selected from the group consisting of zinc, aluminum magnesium, and alloys thereof.

6. In a method of improving the corrosion resistant properties of a metal substrate coated with a metal-filled organic coating, including the steps of placing said organic coating containing particles of said metal dispersed therein on said metal substrate, and curing said organic coating to form a coating adherent to said metal substrate the improvement comprising in combination therewith, the step of subjecting said coated substrate to a high voltage electric discharge, wherein said high voltage electric discharge is sufficient to reduce the electrical resistance of the cured coating, thereby providing a coating which affords galvanic protection to the metal substrate.

7. The method according to claim 6 wherein said high voltage electric discharge is sufficient to electrically interconnect such metal particles thereby assuring electrical contact between such particles and said metal substrate.

8. The method according to claim 6 wherein said metal particles are selected from the group consisting of zinc, aluminum, magnesium, and alloys thereof.

9. The method according to claim 8 wherein said high voltage electric discharge is sufficient to electrically interconnect such metal particles thereby assuring electrical contact between such particles and said metal substrate.

10. The method according to claim 9 wherein said metal substrate is a ferrous alloy.

11. The method according to claim 6, wherein a first corrosion-inhibiting layer is provided intermediate said metal substrate and said organic coating.

12. The method according to claim 11 wherein said metal particles are selected from the group consisting of zinc, aluminum, magnesium and alloys thereof 13. The method according to claim 12 wherein said high voltage electric discharge is sufficient to electrically interconnect such metal particles thereby assuring electrical contact between such particles and said metal substrate.

14. The method according to claim 13 wherein said metal substrate is a ferrous alloy.

* * * * *